United States Patent
Lee et al.

(10) Patent No.: US 10,206,239 B2
(45) Date of Patent: Feb. 12, 2019

(54) SIMULTANEOUS DATA TRANSMISSION METHOD BASED ON MULTIPLE NETWORKS, AND APPARATUS THEREFOR

(71) Applicant: SK TELECOM CO., LTD., Seoul (KR)

(72) Inventors: Gyumin Lee, Yongin-si (KR); Jeongsu Kim, Seongnam-si (KR)

(73) Assignee: SK TELECOM CO., LTD., Seoul (KR)

(*) Notice: Subject to any disclaimer, the term of this patent is extended or adjusted under 35 U.S.C. 154(b) by 17 days.

(21) Appl. No.: 14/082,500

(22) Filed: Nov. 18, 2013

(65) Prior Publication Data
US 2014/0073323 A1 Mar. 13, 2014

Related U.S. Application Data

(63) Continuation of application No. PCT/KR2013/000151, filed on Jan. 9, 2013.

(30) Foreign Application Priority Data

Jan. 19, 2012 (KR) ........................ 10-2012-0006347

(51) Int. Cl.
*H04W 76/15* (2018.01)
*H04B 7/155* (2006.01)
(Continued)

(52) U.S. Cl.
CPC ............ *H04W 76/15* (2018.02); *H04B 7/155* (2013.01); *H04W 16/14* (2013.01);
(Continued)

(58) Field of Classification Search
CPC ... H04W 76/025; H04W 76/15; H04W 76/16; H04W 16/14; H04W 60/005; H04B 7/155
(Continued)

(56) References Cited

U.S. PATENT DOCUMENTS 5,423,059 A * 6/1995 LoGalbo .............. H04B 7/0671
375/356
7,877,057 B2 * 1/2011 Izumikawa ............ H04B 7/155
455/15
(Continued)

FOREIGN PATENT DOCUMENTS

CN 101715209 A 5/2010
JP 2011166251 A 8/2011
(Continued)

OTHER PUBLICATIONS

International Search Report dated Apr. 22, 2013 for PCT/KR2013/000151.
(Continued)

*Primary Examiner* — David Orange
(74) *Attorney, Agent, or Firm* — Hauptman Ham, LLP

(57) ABSTRACT

Disclosed is a relay for a simultaneous data transmission using multiple networks including: a connection control unit configured to control a terminal equipment to connect to multiple networks, when sensing entrance of the terminal equipment currently connected with a macro base station of the mobile communication network into simultaneous transmission service coverage serviced by the multiple networks, at least one of the multiple networks including at least one micro base station; and a relay processing unit configured to partition data transmitted or received to/from the terminal equipment into partial data corresponding to each of the multiple networks, and transmit and/or receive the partitioned partial data through each of the multiple networks.

18 Claims, 6 Drawing Sheets

(51) Int. Cl.
　　*H04W 60/00*　　　(2009.01)
　　*H04W 16/14*　　　(2009.01)
　　*H04W 76/34*　　　(2018.01)
　　*H04W 84/04*　　　(2009.01)
　　*H04W 16/32*　　　(2009.01)
　　*H04W 88/06*　　　(2009.01)
　　*H04W 76/16*　　　(2018.01)

(52) U.S. Cl.
　　CPC ......... *H04W 60/005* (2013.01); *H04W 76/16* (2018.02); *H04W 16/32* (2013.01); *H04W 76/34* (2018.02); *H04W 84/047* (2013.01); *H04W 88/06* (2013.01)

(58) Field of Classification Search
　　USPC .......................................... 455/436
　　See application file for complete search history.

(56) References Cited

U.S. PATENT DOCUMENTS

| | | | |
|---|---|---|---|
| 8,019,288 B2* | 9/2011 | Yu ........................... | H04B 7/022 370/279 |
| 2002/0102987 A1* | 8/2002 | Souisse ................... | H04L 25/14 455/454 |
| 2009/0005099 A1* | 1/2009 | Jung ..................... | H04W 48/12 455/517 |
| 2009/0129359 A1* | 5/2009 | Lee ....................... | H04W 36/14 370/342 |
| 2009/0156177 A1* | 6/2009 | Aaron ....................... | 455/414.1 |
| 2009/0288139 A1* | 11/2009 | Huber et al. ...................... | 726/2 |
| 2010/0189084 A1* | 7/2010 | Chen et al. ................... | 370/338 |
| 2010/0278141 A1* | 11/2010 | Choi-Grogan et al. ...... | 370/331 |
| 2011/0103294 A1* | 5/2011 | Liu ........................ | H04B 7/155 370/315 |
| 2011/0312267 A1* | 12/2011 | Oh ........................ | H04B 7/155 455/7 |
| 2012/0026865 A1* | 2/2012 | Fan et al. ...................... | 370/225 |
| 2012/0275369 A1* | 11/2012 | Zhang et al. .................. | 370/312 |
| 2013/0215835 A1* | 8/2013 | Chen et al. ................... | 370/329 |

FOREIGN PATENT DOCUMENTS

| | | |
|---|---|---|
| KR | 1020050121118 A | 12/2005 |
| KR | 1020070041096 A | 4/2007 |
| KR | 1020090080742 A | 7/2009 |
| KR | 1020090081639 A | 7/2009 |
| KR | 1020120003114 A | 1/2012 |

OTHER PUBLICATIONS

Korean Notice of Allowance dated Feb. 20, 2014 for application No. 10-2012-0006347.
Korean Office Action dated Jun. 21, 2013 for application No. 10-2012-0006347.

* cited by examiner

SIMULTANEOUS DATA TRANSMISSION METHOD BASED ON MULTIPLE NETWORKS, AND APPARATUS THEREFOR

CROSS-REFERENCE TO RELATED APPLICATION

The present application is a continuation of International Application No. PCT/KR2013/000151 filed on Jan. 9, 2013, which is based on, and claims priority from, KR Application Serial Number 10-2012-0006347, filed on Jan. 19, 2012. The disclosures of the above-listed applications are hereby incorporated by reference herein in their entirety.

FIELD

The present disclosure relates to an apparatus and method for providing a simultaneous data transmission service to a terminal equipment entering service coverage.

BACKGROUND

The statements in this section merely provide background information related to the present disclosure and do not constitute prior art.

Communication services based on a plurality of mobile communication networks such as WCDMA, CDMA, WiBro, Long Term Evolution (LTE) and the like are provided recently. In addition, communication services based on a WLAN (WiFi) network, i.e., a short range wireless network, are also provided.

Although the network environment is a multi-network environment in which various kinds of networks are mixed, it is known that only one network is selected from the multiple networks to transmit data.

The inventor(s) has noted that such a known method has a limit in providing a smooth data service since the load rate of the one selected network abruptly increases when a large amount of data are transmitted and/or received. In addition, the inventor(s) has noted that this known method is inappropriate in an environment in which a variety of wireless devices such as a smart phone, a tablet PC and the like are provided further more, and a variety of large-scale data services for such wireless devices are also provided further more.

SUMMARY

In accordance with another aspect of the present disclosure, a relay in a mobile communication network comprises a connection control unit and a relay processing unit. The connection control unit is configured to control a terminal equipment to connect to multiple networks, when sensing entrance of the terminal equipment currently connected with a macro base station of the mobile communication network into simultaneous transmission service coverage serviced by the multiple networks, at least one of the multiple networks including at least one micro base station. And the relay processing unit is configured to partition data transmitted or received to/from the terminal equipment into partial data corresponding to each of the multiple networks, and transmit and/or receive the partitioned partial data through each of the multiple networks In accordance with another aspect of the present disclosure, a terminal equipment in a mobile communication network comprises a service control unit and a communication unit. The service control unit is configured to connect to multiple networks from a macro base station of the mobile communication network, when the terminal equipment currently connected with the macro base station of the mobile communication network enters simultaneous transmission service coverage serviced by the multiple networks, at least one of the multiple networks including the at least one micro base station. And the communication unit is configured to partition data transmitted or received, after the terminal equipment enters the simultaneous transmission service coverage, into partial data corresponding to each of the multiple networks, and transmit and/or receive the partitioned partial data through each of the multiple networks.

In accordance with another aspect of the present disclosure, a relay is configured: to sense entrance of a terminal equipment currently connected with a macro base station of a mobile communication network into simultaneous transmission service coverage serviced by multiple networks, at least one of the multiple networks including at least one micro base station; to control the terminal equipment to connect to the multiple networks from the currently connected macro base station; and to partition data transmitted or received to/from the terminal equipment entering the simultaneous transmission service coverage into partial data corresponding to each of the multiple networks, and transmitting and/or receiving the partitioned partial data through each of the multiple networks.

In accordance with another aspect of the present disclosure, a terminal equipment is configured: to enter simultaneous transmission service coverage serviced by multiple networks from a current connection with a macro base station of a mobile communication network, at least one of the multiple networks including at least one micro base station; to connect to the multiple networks; and to partition data transmitted or received into partial data corresponding to each of the multiple networks, and transmitting and/or receiving the partitioned partial data through each of the multiple networks.

DETAILED DESCRIPTION

Figure 1:
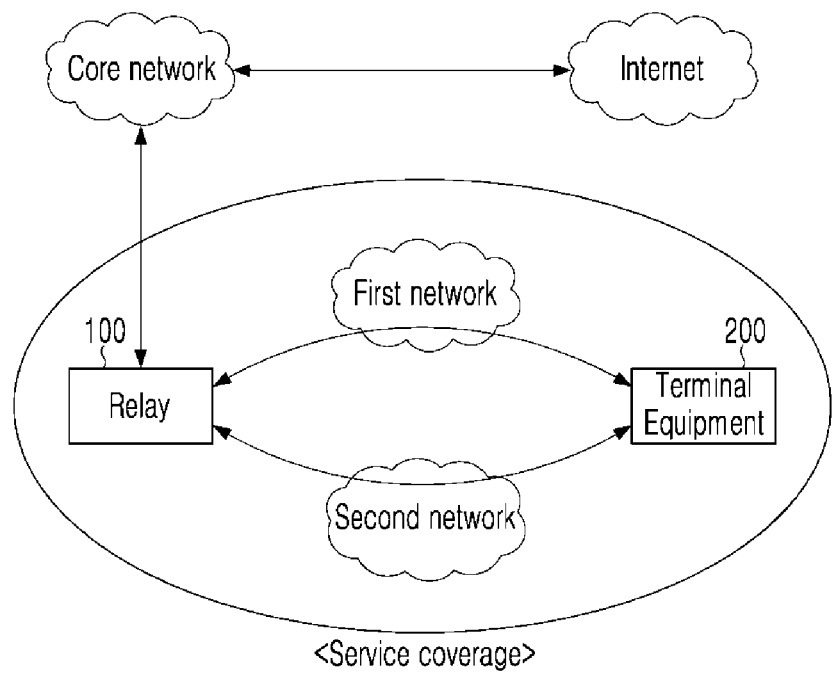
FIG. 1 is a schematic view of the configuration of a simultaneous data transmission system based on multiple networks according to at least one embodiment of the present disclosure.

Some embodiments of the present disclosure will be hereafter described with reference to the accompanying drawings.

In order to provide a smooth data service in the multi-network environment, the present disclosure proposes a simultaneous transmission service, in which a transmitting apparatus partitions data into several partial data and simultaneously transmits the partitioned partial data to a receiving apparatus through two or more (i.e., multiple networks comprising two or more hetero networks) networks. Meanwhile, if coverage of each network in multi networks is different from those of the other networks in performing such a simultaneous transmission service, a handover or the like is occurred in each network at a different time point if the coverage of the network is different from those of the others.

The various embodiments of the present disclosure include at least a first embodiment including a relay simultaneously supporting multiple networks (i.e., multiple networks comprising hetero networks) and a second embodiment including two or more relays respectively supporting multiple networks. The various embodiments of the present disclosure are not limited to the first and second embodiments which are merely identified and described for illustrative purposes.

If the multiple networks are respectively a 3G network or a short range communication network such as a WiFi network, the relay according to the first embodiment simultaneously supports the functions of a connection unit for supporting the 3G network (e.g., a Femtocell base station or a micro base station) and a connection unit for supporting a short range communication network such as the WiFi network (e.g., an access point (AP)), whereas, in the case of the second embodiment, a connection unit for supporting the 3G network (e.g., a Femtocell base station) and a connection unit for supporting a short range communication network such as the WiFi network (e.g., an access point (AP)) are separately included in each of the relays. In this case, the coverage of the connection unit for supporting the 3G network (e.g., a Femtocell base station or a micro base station) is the same as the coverage of the connection unit for supporting a short range communication network such as the WiFi network (e.g., an access point (AP)).

When the terminal equipment (or transceiving apparatus, i.e., an apparatus comprising at least components for transmitting and receiving data or signals in the multi networks) enters the service coverage while being connected to the 3G network using a macro base station, according to the first embodiment, the terminal equipment hands over, for the 3G network, from the macro base station to the connection unit for supporting the 3G network (e.g., a Femtocell base station or a micro base station) included in the relay and is additionally connect to the connection unit for supporting a short range communication network (e.g., an access point (AP)) included in the relay together with the connection unit for supporting the 3G network. Meanwhile, in the case of the second embodiment, since the connection unit for supporting the 3G network (e.g., a Femtocell base station or a micro base station) and the connection unit for supporting a short range communication network such as the WiFi network (e.g., an access point (AP)) are separately included in each of the relays, the terminal equipment hands over, for the 3G network, from the macro base station to the connection unit for supporting the 3G network (e.g., a Femtocell base station or a micro base station) included in the relay, and, separately, the terminal equipment additionally connects to the connection unit for supporting a short range communication network (e.g., an access point (AP)), separated from the connection unit for supporting the 3G network, for the short range communication network.

The terminal equipment simultaneously connects to multiple networks (e.g., networks including two or more hetro communication networks) through the method described above and provide the simultaneous data transmission service based on the multiple networks, and the same method is applied to both of the embodiments for simultaneous data transmission.

Hereinafter, the first embodiment of the present disclosure will be described in detail, and details thereof are applied to the second embodiment of the present disclosure.

FIG. 1 is a view schematically showing the configuration of a simultaneous data transmission system based on multiple networks according to at least one embodiment of the present disclosure.

As shown in FIG. 1, the simultaneous data transmission system based on multiple networks according to the present disclosure has a configuration including a relay 100 for partitioning data and providing a terminal equipment 200 entering service coverage with the partitioned data through multiple networks that can be serviced and, in addition, combining the partitioned data received from the terminal equipment 200 and transferring the combined data to a destination, and the terminal equipment 200 for performing data transmission and/or reception to and from the relay 100 through the multiple networks as the terminal equipment 200 enters the service coverage while transmitting and receiving data through a single network. Here, the relay 100 refers to a base station having local service coverage, e.g., a Femtocell base station for mobile communication, a WiFi AP or the like, and the relay 100 has a configuration of partitioning data on each of the service coverage and transmitting and/or receiving the partitioned data using a plurality of networks.

Here, the terminal equipment 200 refers to a user device for using a data service provided by a certain external device, such as a mobile terminal, a notebook computer, a tablet PC, a PDA or the like, and it is not limited thereto and includes all kinds of devices capable of transmitting and/or receiving data through both a first network and a second network.

In addition, the first network and the second network are a network such as WCDMA, CDMA, WiBro, WLAN (WiFi), Long Term Evolution (LTE) or the like, and they are not limited thereto and include all kinds of networks for providing wireless communication.

In relation to this, if the first network is a 3G network, the first network device 200 corresponds to a Gateway GPRS Support Node (GGSN) of the 3G network. In addition, if the second network is a WiFi network, which is a kind of short range communication network, the second network device 300 corresponds to an access point (AP).

Meanwhile, in the case of uplink in which the terminal equipment 200 transmits data, the terminal equipment 200 functions as a transmitting apparatus, and, on the contrary, in the case of downlink in which the terminal equipment 200 receives data, the terminal equipment 200 functions as a receiving apparatus.

Here, although the multiple networks on the service coverage are a variety of networks including, for example, WCDMA, CDMA, WiBro, WLAN (WiFi), Long Term Evolution (LTE) and the like, in at least one embodiment specifically described herein, the first network refers to a wireless packet service network (WCDMA) (hereinafter, referred to as a "3G network") and the second network refers to a short range wireless network (WiFi) (hereinafter, referred to as a "WiFi network") for the convenience of explanation.

The relay 100 configures service coverage for servicing the multiple networks simultaneously.

Further specifically, the relay 100 configures service coverage for simultaneously servicing the 3G network and the WiFi network and matches coverage of the 3G and WiFi networks to the service coverage. At this point, the relay 100 matches an effective range of coverage, in which the terminal equipment 200 entering the service coverage recognizes each of the 3G network and the WiFi network, by adjusting a distance of transferring data (latency) on the service coverage for each of the 3G network and the WiFi network configuring the service coverage.

In addition, the relay 100 senses (or detects) entrance of the terminal equipment 200 into the service coverage.

Further specifically, if it is confirmed that the terminal equipment 200 transmitting and/or receiving data through a single network (e.g., the 3G network) on a macro area enters the service coverage, the relay 100 confirms multiple networks that can be serviced for the terminal equipment 200. That is, the relay 100 services the 3G network and the WiFi network on the service coverage, and as the terminal equipment 200 transmitting and/or receiving data through a single network (e.g., the 3G network) enters the service coverage, the relay 100 confirms that the terminal equipment 200 attempts handover for the 3G network and, in addition, attempts additional connection to the WiFi network by activating a separate communication module.

On the other hand, instead of the relay 100, the terminal equipment 200 itself confirms whether or not the service coverage is service coverage for simultaneous transmission using multiple networks. The terminal equipment 200 confirms whether or not the service coverage is service coverage for simultaneous transmission through a policy of receiving data through at least one of the multiple networks.

Furthermore, as entrance of the terminal equipment 200 into the service coverage is sensed, the relay 100 controls the terminal equipment 200 to connect to the multiple networks simultaneously serviced on the service coverage.

Further specifically, when the terminal equipment 200 transmitting and/or receiving data through a single network (e.g., the 3G network) on a macro area enters the service coverage, the relay 100 supports (controls or commands) handover for the terminal equipment 200 so that the connection state for the 3G network serviced on the macro area is switched to the 3G network serviced by the relay 100. At the same time, when the terminal equipment 200 enters the service coverage, the relay 100 performs communication with the activated communication module so that the terminal equipment 200 additionally connects to the WiFi network serviced by the relay 100, in addition to the handover for the 3G network.

In addition, as a downlink procedure is performed, the relay 100 selects data transferred to the terminal equipment 200 entering the service coverage as partial data corresponding to (adapted to) each of the confirmed multiple networks.

Further specifically, when data transferred from the core network to the terminal equipment 200 entering the service coverage is received through an external connection network, e.g., the 3G network or the WiFi network, the relay 100 confirms data transmission rates variably set between the networks, i.e., a first transmission rate for transmitting data to the 3G network and a second transmission rate for transmitting data to the WiFi network. Furthermore, the relay 100 selects a first partial data to be transmitted to the 3G network among the partial data partitioned from the data received from the core network based on the confirmed transmission rates and, in addition, a second partial data to be transmitted to the WiFi network among the other partial data. In relation to this, the relay 100 dynamically and variably sets the data transmission rates between the networks based on a variety of factors, such as network characteristics, a current load state, a type of transmission target data and the like of each network, or receive variably set data transmission rates from a separate external device (not shown) and set the received data transmission rates as the data transmission rates between the networks.

In addition, the relay 100 transmits the selected partial data using each of corresponding networks.

Further specifically, the relay 100 transmits the partial data selected in correspondence to each of the networks, i.e., transmits the first partial data to the terminal equipment 200 working as a receiving apparatus through the 3G network and simultaneously transmits the second partial data to the terminal equipment 200 working as a receiving apparatus through the WiFi network.

Meanwhile, as an uplink procedure is performed, the relay 100 restores the data by combining the partial data received from the terminal equipment 200 and transfers the restored data to a destination.

Further specifically, the relay 100 receives the first partial data through the 3G network and, in addition, the second partial data through the WiFi network from the terminal equipment 200 positioned in the service coverage. In addition, the relay 100 restores the transmission target data desired to be transmitted by the terminal equipment 200, by creating the data by combining the first partial data and the second partial data based on the virtual network connection information included in the received first partial data and second partial data. That is, the relay 100 creates the original transmission target data by recognizing the first partial data and the second partial data having the same virtual network connection information based on the virtual network connection information included in a plurality of received partial data and associating and combining the first partial data and the second partial data according to the sequence information included in the corresponding partial data. Furthermore, the relay 100 transfers the restored data to the core network through an external connection network, e.g., the 3G network or the WiFi network, so that the restored data are transferred to a destination desired to be transmitted by the terminal equipment 200.

The terminal equipment 200 connects to the relay 100 through the multiple networks as the terminal equipment 200 enters the service coverage.

Further specifically, when the terminal equipment 200 enters the service coverage which simultaneously services the 3G network and the WiFi network, while transmitting and/or receiving data through a single network (e.g., the 3G network) on a macro area, the terminal equipment 200 additionally senses WiFi network signals. Accordingly, the terminal equipment 200 connects to the relay 100 through handover of the 3G network and, at the same time, connects to the relay 100 through the WiFi network by activating a separate communication module for additional connection to the WiFi network. Here, since an effective range of coverage is set to be matched to the other in the case of the 3G network and the WiFi network configuring the service coverage, the terminal equipment 200 entering the service coverage recognizes the 3G network and the WiFi network at the same time.

In addition, as a downlink procedure is performed through the connection to the relay 100, the terminal equipment 200 receives partial data from the relay 100 through the multiple networks.

Further specifically, when data is transferred through the core network after connecting to the relay 100 through the 3G network and the WiFi network, the terminal equipment 200 receives the first partial data through the 3G network and, in addition, the second partial data through the WiFi network from the relay 100. In addition, the terminal equipment 200 restores the data transferred through the core network, by creating the data by combining the first partial data and the second partial data based on the virtual network connection information included in the received first partial data and second partial data.

Meanwhile, when an uplink procedure is performed through the connection to the relay 100, the terminal equipment 200 selects a transfer target data as partial data corresponding to the connected multiple networks.

Further specifically, when the terminal equipment 200 transmits data to the core network after connecting to the relay 100 through the 3G network and the WiFi network, the terminal equipment 200 confirms data transmission rates variably set between the networks, i.e., a first transmission rate for transmitting data to the 3G network and a second transmission rate for transmitting data to the WiFi network. Furthermore, the terminal equipment 200 selects a first partial data to be transmitted to the 3G network among the partial data partitioned from the data based on the confirmed transmission rates and, in addition, a second partial data to be transmitted to the WiFi network among the other partial data. In relation to this, the terminal equipment 200 dynamically and variably sets the data transmission rates between the networks based on a variety of factors, such network characteristics, a current load state, a type of transmission target data and the like of each network, or receive variably set data transmission rates from a separate external device (not shown) and set the received data transmission rates as the data transmission rates between the networks.

In addition, the terminal equipment 200 transmits the selected partial data using corresponding networks.

Further specifically, the terminal equipment 200 transmits the partial data selected in correspondence to each of the networks, i.e., transmits the first partial data to the relay 100 working as a receiving apparatus through the 3G network and simultaneously transmits the second partial data to the relay 100 working as a receiving apparatus through the WiFi network, so that the relay 100 restores the data by combining the first partial data and the second partial data and transfer the restored data to a destination through the core network.

Furthermore, when the terminal equipment 200 is confirmed to be out of the service coverage, the terminal equipment 200 performs data transmission and/or reception through a single network.

Further specifically, when the terminal equipment 200 moves out of the service coverage servicing the 3G network and the WiFi network and returns to the macro area servicing a single network (e.g., the 3G network), the terminal equipment 200 performs handover of the 3G network and, at the same time, deactivates the communication module for connecting to the WiFi network so that the data are transmitted or received only through the 3G network.

Figure 2:
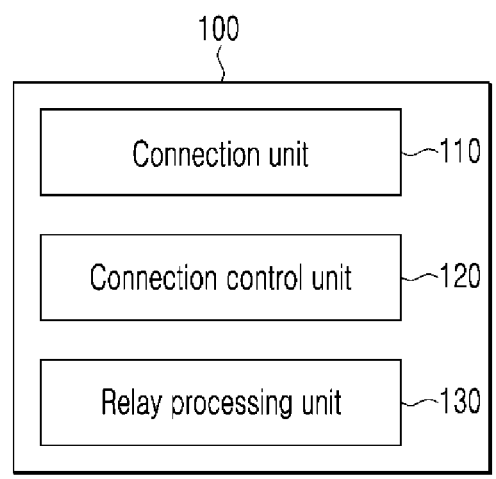
FIG. 2 is a schematic view of the configuration of a relay according to at least one embodiment of the present disclosure.

Hereinafter, a further specific configuration of the relay 100 according to at least one embodiment of the present disclosure will be described with reference to FIG. 2.

That is, the relay 100 has a configuration including a connection unit 110 configuring service coverage for servicing the multiple networks simultaneously, a connection control unit 120 allowing the terminal equipment 200 to connect through the multiple networks on the service coverage, and a relay processing unit 130 for partitioning data and providing the partitioned data to the terminal equipment 200 through the multiple networks and, in addition, combining partitioned data received from the terminal equipment 200 and transferring the combined data to a destination. Other components of the relay 100, such as the connection unit 110, the connection control unit 120, and relay processing unit 130 are implemented by one or more processors and/or application-specific integrated circuits (ASICs).

The connection unit 110 configures service coverage for servicing the multiple networks simultaneously.

Further specifically, the connection unit 110 configures service coverage for simultaneously servicing the 3G network and the WiFi network and matches coverage of the 3G and WiFi networks to the service coverage. At this point, the connection unit 110 matches an effective range of coverage, in which the terminal equipment 200 entering the service coverage recognizes each of the 3G network and the WiFi network, by adjusting a distance of transferring data (latency) on the service coverage for each of the 3G network and the WiFi network configuring the service coverage.

The connection control unit 120 senses (or detects) entrance of the terminal equipment 200 into the service coverage.

Further specifically, if it is confirmed that the terminal equipment 200 transmitting and/or receiving data through a single network (e.g., the 3G network) on a macro area enters the service coverage, the connection control unit 120 confirms multiple networks that can be serviced for the terminal equipment 200. That is, the connection unit 110 services the 3G network and the WiFi network on the service coverage, and as the terminal equipment 200 transmitting and/or receiving data through a single network (e.g., the 3G network) enters the service coverage, the connection unit 110 confirms that the terminal equipment 200 attempts handover for the 3G network and, in addition, attempts additional connection to the WiFi network by activating a separate communication module.

Furthermore, as entrance of the terminal equipment 200 into the service coverage is sensed, the connection control unit 120 controls the terminal equipment 200 to connect to the multiple networks simultaneously serviced on the service coverage.

Further specifically, when the terminal equipment 200 transmitting and/or receiving data through a single network (e.g., the 3G network) on a macro area enters the service coverage, the connection control unit 120 supports (controls) handover for the terminal equipment 200 so that the connection state for the 3G network serviced on the macro area is switched to the 3G network serviced by the connection unit 110. At the same time, when the terminal equipment 200 enters the service coverage, the connection control unit 120 performs communication with the activated communication module so that the terminal equipment 200 additionally connects to the WiFi network serviced by the connection unit 110, in addition to the handover for the 3G network.

In addition, as a downlink procedure is performed, the relay processing unit 130 selects data transferred to the terminal equipment 200 entering the service coverage as partial data corresponding to the confirmed multiple networks.

Further specifically, when data transferred from the core network to the terminal equipment 200 entering the service coverage is received through an external connection network, e.g., the 3G network or the WiFi network, the relay processing unit 130 confirms data transmission rates variably set between the networks, i.e., a first transmission rate for transmitting data to the 3G network and a second transmission rate for transmitting data to the WiFi network.

Furthermore, the relay processing unit 130 selects a first partial data to be transmitted to the 3G network among the partial data partitioned from the data received from the core network based on the confirmed transmission rates and, in addition, a second partial data to be transmitted to the WiFi network among the other partial data.

In addition, the relay processing unit 130 transmits the selected partial data using corresponding networks.

Further specifically, the relay processing unit 130 transmits the partial data selected in correspondence to each of the networks, i.e., transmits the first partial data to the terminal equipment 200 working as a receiving apparatus through the 3G network and simultaneously transmits the second partial data to the terminal equipment 200 working as a receiving apparatus through the WiFi network.

Meanwhile, as an uplink procedure is performed, the relay processing unit 130 restores the data by combining the partial data received from the terminal equipment 200 and transfers the restored data to a destination.

Further specifically, the relay processing unit 130 receives the first partial data through the 3G network and, in addition, the second partial data through the WiFi network from the terminal equipment 200 positioned in the service coverage. In addition, the relay processing unit 130 restores the transmission target data desired to be transmitted by the terminal equipment 200, by creating the data by combining the first partial data and the second partial data based on the virtual network connection information included in the received first partial data and second partial data. That is, the relay processing unit 130 creates the original transmission target data by recognizing the first partial data and the second partial data having the same virtual network connection information based on the virtual network connection information included in a plurality of received partial data and associating and combining the first partial data and the second partial data according to the sequence information included in the corresponding partial data. Furthermore, the relay processing unit 130 transfers the restored data to the core network through an external connection network, e.g., the 3G network or the WiFi network, so that the restored data are transferred to a destination desired to be transmitted by the terminal equipment 200.

Figure 3:
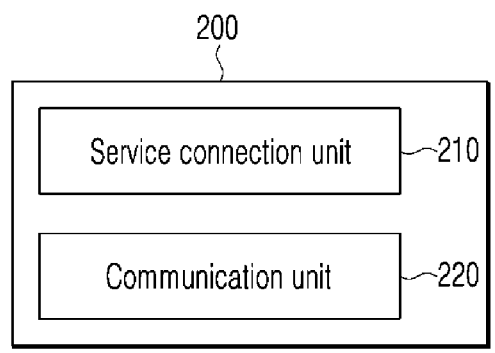
FIG. 3 is a schematic view of the configuration of a terminal equipment according to at least one embodiment of the present disclosure.

Hereinafter, a further specific configuration of the terminal equipment 200 according to at least one embodiment of the present disclosure will be described with reference to FIG. 3.

That is, the terminal equipment 200 has a configuration including a service connection unit 210 connecting to the relay 100 through the multiple networks as the terminal equipment 200 enters service coverage and a communication unit 220 performing transmission and/or reception of data through the multiple networks. Other components of the terminal equipment 200, such as the service connection unit 210 and the communication unit 220 are implemented by one or more processors and/or application-specific integrated circuits (ASICs).

The service connection unit 210 connects to the relay 100 through the multiple networks as the terminal equipment 200 enters the service coverage.

Further specifically, when the terminal equipment 200 enters the service coverage which simultaneously services the 3G network and the WiFi network, while transmitting and/or receiving data through a single network (e.g., the 3G network) on a macro area, the service connection unit 210 additionally senses WiFi network signals. Accordingly, the service connection unit 210 connects to the relay 100 through handover of the 3G network and, at the same time, connects to the relay 100 through the WiFi network by activating a separate communication module for additional connection to the WiFi network. Here, since an effective range of coverage is set to be matched to the other in the case of the 3G network and the WiFi network configuring the service coverage, the service connection unit 210 recognizes the 3G network and the WiFi network at the same time when the terminal equipment 200 enters the service coverage.

In addition, as a downlink procedure is performed through the connection to the relay 100, the communication unit 220 receives partial data from the relay 100 through the multiple networks.

Further specifically, when data is transferred through the core network after the service connection unit 210 connects to the relay 100 through the 3G network and the WiFi network, the communication unit 220 receives the first partial data through the 3G network and, in addition, the second partial data through the WiFi network from the relay 100. In addition, the communication unit 220 restores the data transferred through the core network, by creating the data by combining the first partial data and the second partial data based on the virtual network connection information included in the received first partial data and second partial data.

Meanwhile, when an uplink procedure is performed through the connection to the relay 100, the communication unit 220 selects a transfer target data as partial data corresponding to the connected multiple networks.

Further specifically, when the communication unit 220 transmits data to the core network after the service connection unit 210 connects to the relay 100 through the 3G network and the WiFi network, the communication unit 220 confirms data transmission rates variably set between the networks, i.e., a first transmission rate for transmitting data to the 3G network and a second transmission rate for transmitting data to the WiFi network. Furthermore, the communication unit 220 selects a first partial data to be transmitted to the 3G network among the partial data partitioned from the data based on the confirmed transmission rates and, in addition, a second partial data to be transmitted to the WiFi network among the other partial data.

In addition, the communication unit 220 transmits the selected partial data using corresponding networks.

Further specifically, the communication unit 220 transmits the partial data selected in correspondence to each of the networks, i.e., transmits the first partial data to the relay 100 working as a receiving apparatus through the 3G network and simultaneously transmits the second partial data to the relay 100 working as a receiving apparatus through the WiFi network, so that the relay 100 restores the data by combining the first partial data and the second partial data and transfer the restored data to a destination through the core network.

Furthermore, when the terminal equipment 200 is confirmed to be out of the service coverage, the service connection unit 210 performs data transmission and/or reception through a single network.

Further specifically, when the terminal equipment 200 moves out of the service coverage servicing the 3G network and the WiFi network and returns to the macro area servicing a single network (e.g., the 3G network), the service connection unit 210 performs handover of the 3G network and, at the same time, deactivates the communication module for connecting to the WiFi network so that the data are transmitted or received only through the 3G network.

Meanwhile, the terminal equipment 200 further includes a storage unit (not shown) for storing a policy of receiving data through at least one of the multiple networks, and the terminal equipment 200 confirms whether or not the service coverage is service coverage for simultaneously transmitting data through the multiple networks through the policy stored in the storage unit.

As described above, according to the simultaneous data transmission system using multiple networks, since a distance of the transmission network (latency) for transferring data is matched between the multiple networks by providing a simultaneous data transmission service to a terminal equipment entering service coverage in an environment of configuring the service coverage for servicing the multiple networks simultaneously and matching the effective range of coverage of each of the multiple networks configuring the service coverage, generation of handoff occurring at a different time point in each network due to mismatch of coverage among the multiple networks will be prevented, and it is easy to estimate a data transmission speed of each network and set a policy for simultaneous data transmission, and thus transmission performance of the simultaneous transmission service can be guaranteed and improved.

Figure 4:
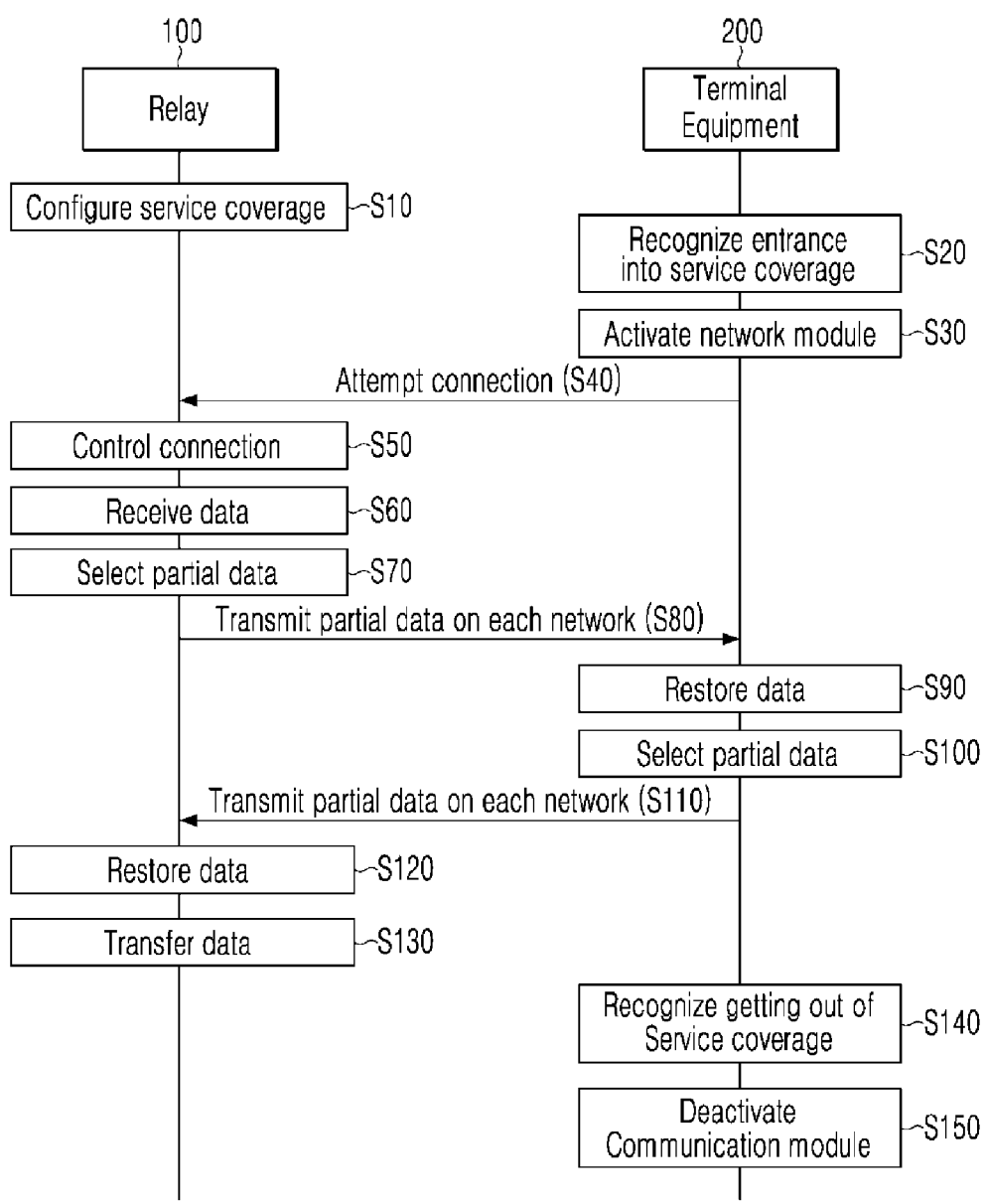
FIG. 4 is a flowchart of operating a simultaneous data transmission system based on multiple networks according to at least one embodiment of the present disclosure.
Figure 5:
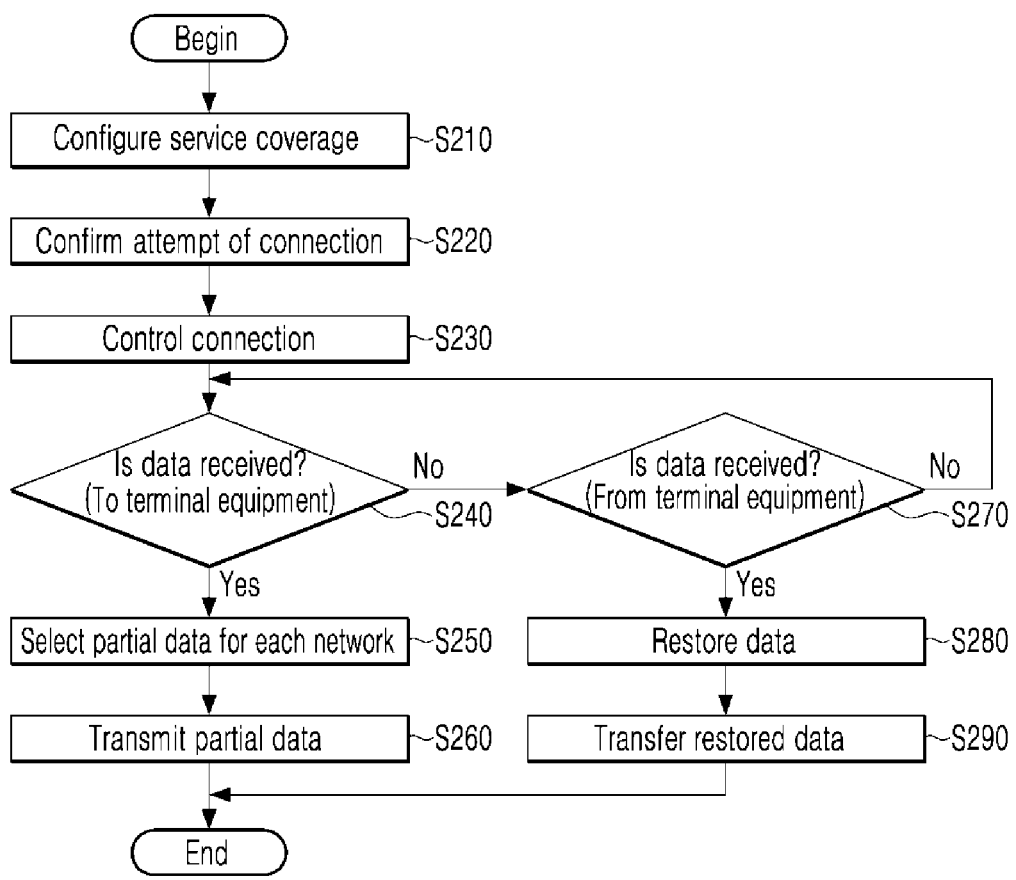
FIG. 5 is a flowchart of operation of a relay according to at least one embodiment of the present disclosure.
Figure 6:
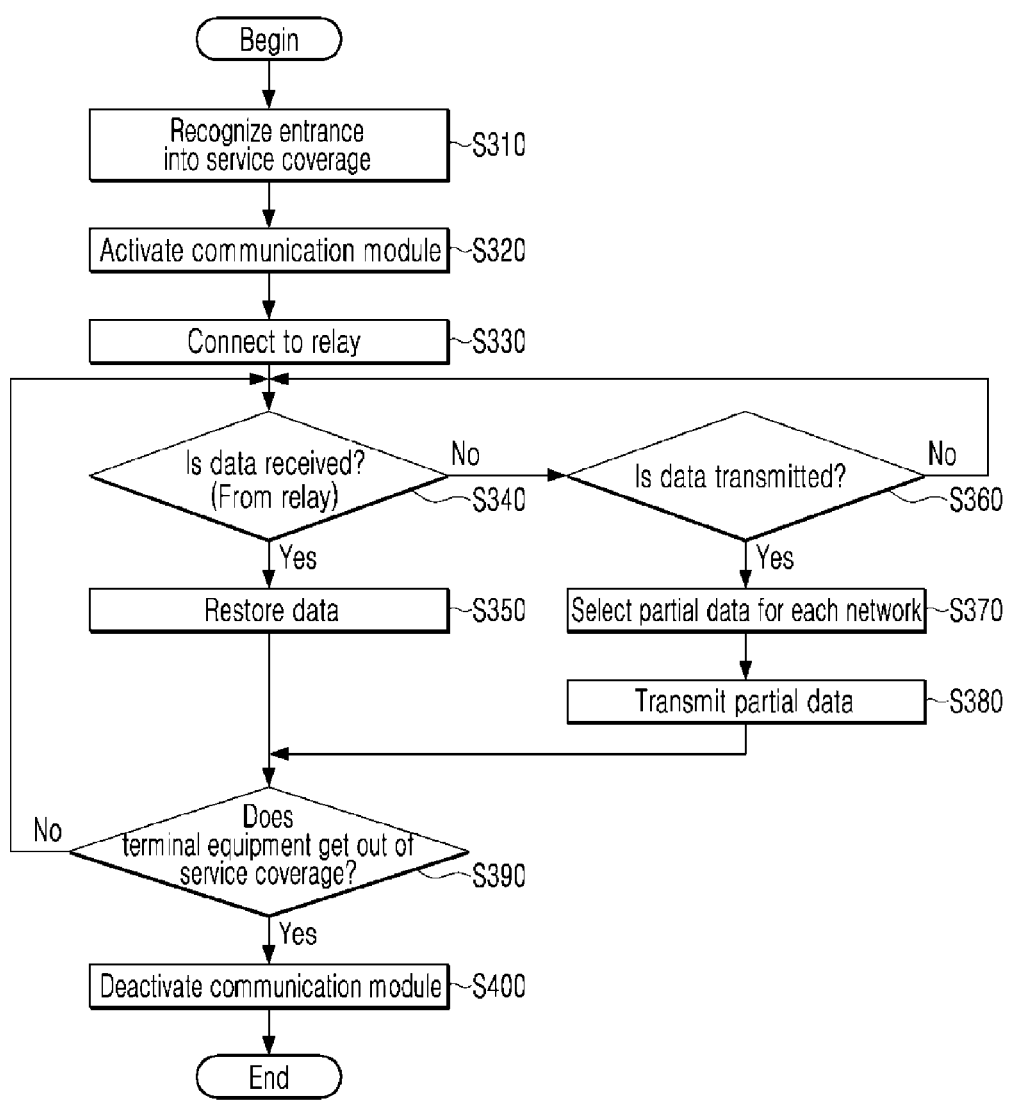
FIG. 6 is a flowchart of operation of a terminal equipment according to at least one embodiment of the present disclosure.

Hereinafter, a simultaneous data transmission method based on multiple networks according to at least one embodiment of the present disclosure will be described with reference to FIGS. 4 to 6. Here, the configuration shown in FIGS. 1 to 3 will be described using corresponding reference numerals for the convenience of explanation.

First of all, a method of operating the simultaneous data transmission system based on multiple networks according to at least one embodiment of the present disclosure will be described with reference to FIG. 4.

First, the relay 100 configures service coverage for servicing the multiple networks simultaneously S10.

Preferably, the relay 100 configures service coverage for simultaneously servicing the 3G network and the WiFi network and matches coverage of the 3G and WiFi networks to the service coverage. At this point, the relay 100 matches an effective range of coverage, in which the terminal equipment 200 entering the service coverage recognizes each of the 3G network and the WiFi network, by adjusting a distance of transferring data (latency) on the service coverage for each of the 3G network and the WiFi network configuring the service coverage.

Then, the terminal equipment 200 attempts connection to the relay 100 through the multiple networks as the terminal equipment 200 enters the service coverage S20 to S40.

Preferably, when the terminal equipment 200 enters the service coverage which simultaneously services the 3G network and the WiFi network, while transmitting and/or receiving data through a single network (e.g., the 3G network) on a macro area, the terminal equipment 200 additionally senses WiFi network signals. Accordingly, the terminal equipment 200 connects to the relay 100 through handover of the 3G network and, at the same time, attempts connection to the relay 100 through the WiFi network by activating a separate communication module for additional connection to the WiFi network. Here, since an effective range of coverage is set to be matched to the other in the case of the 3G network and the WiFi network configuring the service coverage, the terminal equipment 200 entering the service coverage recognizes the 3G network and the WiFi network at the same time.

Furthermore, as entrance of the terminal equipment 200 into the service coverage is sensed, the relay 100 controls the terminal equipment 200 to connect to the multiple networks simultaneously serviced on the service coverage S50.

Preferably, when the terminal equipment 200 transmitting and/or receiving data through a single network (e.g., the 3G network) on a macro area enters the service coverage, the relay 100 supports (controls or commands) handover for the terminal equipment 200 so that the connection state for the 3G network serviced on the macro area is switched to the 3G network serviced by the relay 100. At the same time, when the terminal equipment 200 enters the service coverage, the relay 100 performs communication with the activated communication module so that the terminal equipment 200 additionally connects to the WiFi network serviced by the relay 100, in addition to the handover for the 3G network.

Then, as a downlink procedure is performed, the relay 100 selects data transferred to the terminal equipment 200 entering the service coverage as partial data corresponding to the confirmed multiple networks S60 and S70.

Next, the relay 100 transmits the selected partial data using corresponding networks S80.

Preferably, the relay 100 transmits the partial data selected in correspondence to each of the networks, i.e., transmits the first partial data to the terminal equipment 200 working as a receiving apparatus through the 3G network and simultaneously transmits the second partial data to the terminal equipment 200 working as a receiving apparatus through the WiFi network.

In relation to this, as a downlink procedure is performed through the connection to the relay 100, the terminal equipment 200 receives partial data from the relay 100 through the multiple networks and restores the data S90.

Furthermore, when an uplink procedure is performed through the connection to the relay 100, the terminal equipment 200 selects a transfer target data as partial data corresponding to the connected multiple networks S100.

Then, the terminal equipment 200 transmits the selected partial data using corresponding networks S110.

Preferably, the terminal equipment 200 transmits the partial data selected in correspondence to each of the networks, i.e., transmits the first partial data to the relay 100 working as a receiving apparatus through the 3G network and simultaneously transmits the second partial data to the relay 100 working as a receiving apparatus through the WiFi network, so that the relay 100 restores the data by combining the first partial data and the second partial data and transfer the restored data to a destination through the core network.

In relation to this, as an uplink procedure is performed, the relay 100 restores the data by combining the partial data received from the terminal equipment 200 and transfers the restored data to a destination S120 and S130.

Meanwhile, when the terminal equipment 200 is confirmed to be out of the service coverage, the terminal equipment 200 performs data transmission and/or reception through a single network S140 and S150.

Preferably, when the terminal equipment 200 moves out of the service coverage servicing the 3G network and the WiFi network and returns to the macro area servicing a single network (e.g., the 3G network), the terminal equipment 200 performs handover of the 3G network and, at the same time, deactivates the communication module for connecting to the WiFi network so that the data are transmitted or received only through the 3G network.

Hereinafter, a method of operating the relay 100 according to at least one embodiment of the present disclosure will be described with reference to FIG. 5.

First, the connection unit 110 configures service coverage for servicing the multiple networks simultaneously S210.

Preferably, the connection unit 110 configures service coverage for simultaneously servicing the 3G network and the WiFi network and matches coverage of the 3G and WiFi networks to the service coverage. At this point, the connection unit 110 matches an effective range of coverage, in which the terminal equipment 200 entering the service coverage recognizes each of the 3G network and the WiFi network, by adjusting a distance of transferring data (latency) on the service coverage for each of the 3G network and the WiFi network configuring the service coverage.

Then, the connection control unit 120 senses entrance of the terminal equipment 200 into the service coverage S220.

Preferably, if it is confirmed that the terminal equipment 200 transmitting and/or receiving data through a single network (e.g., the 3G network) on a macro area enters the service coverage, the connection control unit 120 confirms multiple networks that can be serviced for the terminal equipment 200. That is, the connection unit 110 services the 3G network and the WiFi network on the service coverage, and as the terminal equipment 200 transmitting and/or receiving data through a single network (e.g., the 3G network) enters the service coverage, the connection unit 110 confirms that the terminal equipment 200 attempts handover for the 3G network and, in addition, attempts additional connection to the WiFi network by activating a separate communication module.

Next, as entrance of the terminal equipment 200 into the service coverage is sensed, the connection control unit 120 controls the terminal equipment 200 to connect to the multiple networks simultaneously serviced on the service coverage S230.

Preferably, when the terminal equipment 200 transmitting and/or receiving data through a single network (e.g., the 3G network) on a macro area enters the service coverage, the connection control unit 120 supports (controls) handover for the terminal equipment 200 so that the connection state for the 3G network serviced on the macro area is switched to the 3G network serviced by the connection unit 110. At the same time, when the terminal equipment 200 enters the service coverage, the connection control unit 120 performs communication with the activated communication module so that the terminal equipment 200 additionally connects to the WiFi network serviced by the connection unit 110, in addition to the handover for the 3G network.

Then, as a downlink procedure is performed, the relay processing unit 130 selects data transferred to the terminal equipment 200 entering the service coverage as partial data corresponding to the confirmed multiple networks S240 and S250.

Then, the relay processing unit 130 transmits the selected partial data using corresponding networks S260.

Preferably, the relay processing unit 130 transmits the partial data selected in correspondence to each of the networks, i.e., transmits the first partial data to the terminal equipment 200 working as a receiving apparatus through the 3G network and simultaneously transmits the second partial data to the terminal equipment 200 working as a receiving apparatus through the WiFi network.

Meanwhile, when an uplink procedure is performed, the relay processing unit 130 restores the data by combining the partial data received from the terminal equipment 200 and transfers the restored data to a destination S270 to S290.

Hereinafter, a method of operating the terminal equipment 200 according to at least one embodiment of the present disclosure will be described with reference to FIG. 6.

First, the service connection unit 210 connects to the relay 100 through the multiple networks as the terminal equipment 200 enters the service coverage S310 to S330.

Preferably, when the terminal equipment 200 enters the service coverage which simultaneously services the 3G network and the WiFi network, while transmitting and/or receiving data through a single network (e.g., the 3G network) on a macro area, the service connection unit 210 additionally senses WiFi network signals. Accordingly, the service connection unit 210 connects to the relay 100 through handover of the 3G network and, at the same time, connects to the relay 100 through the WiFi network by activating a separate communication module for additional connection to the WiFi network. Here, since an effective range of coverage is set to be matched to the other in the case of the 3G network and the WiFi network configuring the service coverage, the service connection unit 210 recognizes the 3G network and the WiFi network at the same time when the terminal equipment 200 enters the service coverage.

Then, as a downlink procedure is performed through the connection to the relay 100, the communication unit 220 receives partial data from the relay 100 through the multiple networks S340 and S350.

Preferably, when data is transferred through the core network after the service connection unit 210 connects to the relay 100 through the 3G network and the WiFi network, the communication unit 220 receives the first partial data through the 3G network and, in addition, the second partial data through the WiFi network from the relay 100. In addition, the communication unit 220 restores the data transferred through the core network, by creating the data by combining the first partial data and the second partial data based on the virtual network connection information included in the received first partial data and second partial data.

Meanwhile, when an uplink procedure is performed through the connection to the relay 100, the communication unit 220 selects a transfer target data as partial data corresponding to the connected multiple networks S360 and S370.

Preferably, when the communication unit 220 transmits data to the core network after the service connection unit 210 connects to the relay 100 through the 3G network and the WiFi network, the communication unit 220 confirms data transmission rates variably set between the networks, i.e., a first transmission rate for transmitting data to the 3G network and a second transmission rate for transmitting data to the WiFi network. Furthermore, the communication unit 220 selects a first partial data to be transmitted to the 3G network among the partial data partitioned from the data based on the confirmed transmission rates and, in addition, a second partial data to be transmitted to the WiFi network among the other partial data.

In relation to this, the communication unit 220 transmits the selected partial data using corresponding networks S380.

Preferably, the communication unit 220 transmits the partial data selected in correspondence to each of the networks, i.e., transmits the first partial data to the relay 100 working as a receiving apparatus through the 3G network and simultaneously transmits the second partial data to the relay 100 working as a receiving apparatus through the WiFi network, so that the relay 100 restores the data by combining the first partial data and the second partial data and transfer the restored data to a destination through the core network.

Furthermore, when the terminal equipment 200 is confirmed to be out of the service coverage, the service connection unit 210 performs data transmission and/or reception through a single network S390 and S400.

Preferably, when the terminal equipment 200 moves out of the service coverage servicing the 3G network and the WiFi network and returns to the macro area servicing a single network (e.g., the 3G network), the service connection unit 210 performs handover of the 3G network and, at the same time, deactivates the communication module for connecting to the WiFi network so that the data are transmitted or received only through the 3G network.

The simultaneous data transmission method based on multiple networks according to the embodiments of the present disclosure can be implemented in the form of program commands that can be executed through various computer means and recorded in a non-transitory computer-readable recording medium. The non-transitory computer-readable recording medium includes a program command, a data file, a data structure and the like solely or in a combined manner. The program command recorded in the medium is a program command specially designed and configured for the present disclosure or a program command known to be used by those skilled in the art of the computer software. The non-transitory computer-readable recording medium includes, for example, magnetic media, such as a hard disk, a floppy disk and a magnetic tape, optical media, such as a CD-ROM and a DVD, magneto-optical media, such as a floptical disk, and hardware devices specially configured to store and execute program commands, such as a ROM, a RAM, a flash memory and the like. The program command includes, for example, high-level language codes that can be executed by a computer using an interpreter or the like, as well as a machine code generated by a compiler. The hardware devices can be configured to operate using one or more software modules in order to perform the operation of the present disclosure, and vice versa. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Since the present disclosure matches the effective range of coverage of each of multiple networks configuring service coverage for servicing the multiple networks simultaneously to be the same as the service coverage and provides a simultaneous transmission service to a terminal equipment entering the service coverage, the simultaneous transmission service is provided when a distance of the transmission network (latency) for transferring data is matched between the multiple networks.

In addition, generation of handoff occurring at a different time point in each network due to mismatch of coverage among the multiple networks will be prevented, and it is easy to estimate a data transmission speed of each network and set a policy for simultaneous data transmission, and thus transmission performance of the simultaneous transmission service can be guaranteed and improved.

Although various exemplary embodiments of the present disclosure has been described for illustrative purposes, those skilled in the art will appreciate that various modifications, additions and substitutions are possible, without departing from the scope and spirit of the claimed invention as disclosed in the accompanying claims. Accordingly, the present disclosure is not limited to the embodiments disclosed in the specification of the present disclosure. The scope of the claimed invention is to be determined by not only the following claims but also their equivalents. Specific terms used in this disclosure and drawings are used for illustrative purposes and not to be considered as limitations of the present disclosure.

What is claimed is:

1. A relay in a mobile communication network including a first network and a second network, the relay comprising at least one processor or application specific integrated circuit (ASIC) configured to
   transmit data from both the first network and the second network to a terminal equipment on conditions that (i) the relay detects that the terminal equipment is located at a matching coverage range and (ii) the relay determines that the second network is available for servicing the terminal equipment at the matching coverage range,
      wherein, in order to transmit data from both the first network and the second network with terminal equipment to be located in the matching coverage range, the relay configures the matching coverage range servicing for both (i) a coverage area of a micro base station of the first network and (ii) a coverage area of the second network, wherein the first network is serviced by a macro base station and the micro base station, and
      wherein the relay is configured to configure the matching coverage range by matching a first service coverage range serviced by the micro base station of the first network with a second service coverage range serviced by the second network,
   wherein the relay is configured to detect that the terminal equipment having been currently connected with the macro base station of the first network enters into the matching coverage range which corresponds to the first service coverage serviced by the micro base station,
   wherein when the terminal equipment is detected entering into the matching coverage range and the second network is determined to be available for servicing the terminal equipment located in the matching coverage range, the relay is configured to
      control the terminal equipment to switch the terminal equipment's connection to the first network from the macro base station of the first network to the micro base station of the first network when the entrance of the terminal equipment is detected,
      control the terminal equipment to additionally connect to the second network, and
   wherein the relay is further configured to
      partition data to be transmitted to the terminal equipment into first partial data and second partial data, and
      transmitting, to the terminal equipment, the first partial data through the first network serviced by the micro base station and the second partial data through the second network when a terminal equipment is detected to be located at the matching coverage range.

2. The relay of claim 1, wherein the at least one processor or ASIC is further configured to control the terminal equipment to
   release the current connection from the macro base station, and
   switch the terminal equipment's connection to the first network to the micro base station from the macro base station when the entrance of the terminal equipment into the matching coverage range is detected.

3. The relay of claim 1, wherein the at least one processor or ASIC is further configured to confirm the first network and the second network to simultaneously service the terminal equipment, when the at least one processor or ASIC detects the entrance of the terminal equipment into the first service coverage range serviced by the micro base station.

4. The relay of claim 1, wherein the at least one processor or ASIC is further configured to
control the terminal equipment to perform a handover from the currently connected macro base station to the micro base station for the first network, when the entrance of the terminal equipment into the first service coverage range serviced by the micro base station is detected.

5. The relay of claim 1, wherein the at least one processor or the ASIC is further configured to:
restore two or more partial data received from the terminal equipment, when the terminal equipment simultaneously transmits the two or more partial data through the first network and the second network.

6. A terminal equipment in a mobile communication network including a first network and a second network, wherein the first network is serviced by a macro base station and a micro base station, the terminal equipment comprising at least one processor or application specific integrated circuit (ASIC) configured to:
transmit data from both the first network and the second network to a relay on conditions that (i) the terminal equipment is detected to be located at a matching coverage range and (ii) the second network is determined to be available for servicing the terminal equipment at the matching coverage range,
sense signals of the first network and the second network, when the terminal equipment currently connected with the macro base station of the first network enters in a matching coverage range configured to serve (i) a coverage area of a micro base station of the first network and (ii) a coverage area of the second network;
switch the terminal equipment's connection for the first network from the macro base station of the first network to the micro base station of the first network when the entrance of the terminal equipment is detected and the second network is determined to be available for servicing the terminal equipment located in the matching coverage range; and
additionally connect to the second network when the entrance of the terminal equipment is detected;
partition data to be transmitted, after the terminal equipment enters the matching coverage range, into first partial data and second partial data, and
transmit, to the relay, the first partial data through the first network serviced by the micro base station and the second partial data through the second network when the terminal equipment is detected to be located at the matching coverage range,
wherein the matching coverage range is a service coverage which is configured by matching a first service coverage range serviced by the micro base station of the first network with a second service coverage range serviced by the second network.

7. The terminal equipment of claim 6, wherein the terminal equipment is configured to
release the current connection from the macro base station and
switch the terminal equipment's connection to the first network from the macro base station to the micro base station, when the terminal equipment enters into the matching coverage range.

8. The terminal equipment of claim 6, wherein the at least one processor or the ASIC is further configured to:

restore two or more partial data received from the relay, when the relay simultaneously transmits the two or more partial data through the first network and the second network.

9. A method of transmitting data in a mobile communication network including a first network and a second network, the method comprising:
transmitting data from both the first network and the second network to a terminal equipment on conditions that (i) the relay detects that the terminal equipment is located at a matching coverage range and (ii) the relay determines that the second network is available for servicing the terminal equipment at the matching coverage range;
in order to broadcast both the first network and the second network with terminal equipment to be located at the matching coverage range, configuring matching coverage range servicing for (i) a coverage area of a micro base station of the first network and (ii) a coverage area of the second network,
wherein the first network is serviced by a macro base station and the micro base station;
detecting that the terminal equipment having been currently connected with the macro base station of the first network enters into the matching coverage range which corresponds to the first network service coverage range serviced by the micro base station;
where the method further comprises, when the terminal equipment is detected entering into the matching coverage range, the second network is determined to be available for servicing the terminal equipment located in the matching coverage range,
controlling the terminal equipment to switch the terminal equipment's connection to the first network from the macro base station of the first network to the micro base station of the first network when the entrance of the terminal equipment is detected;
controlling the terminal equipment to additionally connect to the second network;
partitioning data to be transmitted to the terminal equipment into first partial data and second partial data; and
transmitting, to the terminal equipment, the first partial data through the micro base station and the second partial data through the second network when the terminal equipment is detected to be located at the matching coverage range.

10. The method of claim 9, wherein the controlling of the terminal equipment comprises
controlling the terminal equipment to release the current connection from the macro base station and
switch the terminal equipment's connection to the first network from the macro base station to the micro base station, when the entrance of the terminal equipment into the matching coverage range is detected.

11. The method of claim 9, further comprising:
restoring two or more partial data received from the terminal equipment, when the terminal equipment simultaneously transmits the two or more partial data through the first network and the second network.

12. A method of transmitting data in a mobile communication network including a first network and a second network, the method comprising:
transmitting data from both the first network and the second network to a relay on conditions that (i) the terminal equipment is detected to be located at a matching coverage range and (ii) the second network is determined to be available for servicing the terminal equipment at the matching coverage range;
sensing signals of the first network and the second network, when a terminal equipment currently connected with a macro base station of the first network enters in a matching coverage range configured to serve (i) a coverage area of a micro base station of the first network and (ii) a coverage area of the second network, wherein the first network is serviced by the macro base station and a micro base station;
switching the terminal equipment's connection to the first network from the macro base station of the first network to the micro base station of the first network when the entrance of the terminal equipment is sensed and the second network is determined to be available for servicing the terminal equipment located in the matching coverage range;
additionally connecting the terminal equipment to the second network when the entrance of the terminal equipment is sensed;
partitioning data to be transmitted, after the terminal equipment enters the matching coverage range, into first partial data and second partial data; and
transmitting, to the relay, the first partial data through the micro base station and the second partial data through the second network when the terminal equipment is detected to be located at the matching coverage range,
wherein the method further comprises:
matching a first service coverage range serviced by the micro base station of the first network with the second service coverage range serviced by the second network.

13. The method of claim 12, wherein the additionally connecting comprises
releasing the current connection of the terminal equipment from the macro base station, and
connecting the terminal equipment to the micro base station, when the entrance of the terminal equipment into the matching coverage range is detected.

14. The method of claim 12, further comprising:
restoring two or more partial data received from the relay, when the relay simultaneously transmits the two or more partial data through the first network and the second network.

15. A relay in a mobile communication network including a first network and second network, the relay comprising:
a connection control processor, implemented by one or more processors, configured to
transmit data from both the first network and the second network with a terminal equipment on conditions that (i) the relay detects that the terminal equipment is located at a matching coverage range and (ii) the relay determines that the second network is available for servicing the terminal equipment at the matching coverage range,
control a terminal equipment to switch the terminal equipment's current connection to the first network from a macro base station of the first network to a micro base station of the first network, when detecting entrance of the terminal equipment currently connected the first network through the macro base station into the matching coverage range servicing for (i) a coverage area of a micro base station of the first network and (ii) a coverage area of the second network,
wherein the first network is serviced by the macro base station and the micro base station, and
wherein the matching coverage range is same as a first service coverage range serviced by the micro base station of the first network and a second service coverage range of the second network, and
control the terminal equipment to additionally connect to the second network; and
a relay processing processor, implemented by one or more processors, configured to
partition data to be simultaneously transmitted via the first network and the second network into first partial data and second partial data, and
transmitting, to the terminal equipment, the first partial data through the first network serviced by the micro base station and the second partial data through the second network when a terminal equipment is detected to be located at the matching coverage range.

16. A terminal equipment in a mobile communication network including a first network and second network, the terminal equipment comprising at least one processor or application specific integrated circuit (ASIC) configured to:
transmit data from both the first network and the second network to a relay on conditions that (i) the terminal equipment is detected to be located at a matching coverage range and (ii) the second network is determined to be available for servicing the terminal equipment at the matching coverage range,
switch the terminal equipment's current connection to the first network from a macro base station of the first network to a micro base station of the first network when the terminal equipment currently connected the first network through the macro base station enters into a matching coverage range servicing for (i) a coverage area of the micro base station of the first network and (ii) a coverage area of the second network, wherein the matching coverage range is a simultaneous service coverage range for simultaneously transmitting data using both the first network and the second network when a terminal equipment is detected to be located at the matching coverage range,
wherein the first network is serviced by the macro base station and the micro base station, and wherein the matching coverage range is same as a first service coverage range serviced by the micro base station of the first network and a second service coverage range of the second network;
additionally connect to the second network in order to simultaneously transmit data via the first network and the second network;
partition the data to be simultaneously transmitted into first partial data and second partial data; and
simultaneously transmit, to the relay, the first partial data through the first network serviced by the micro base station and the second partial data through the second network when the terminal equipment is detected to be located at the matching coverage range.

17. A method of transmitting data in a mobile communication network including a first network and a second network, the method comprising:
transmitting data from both the first network and the second network to a terminal equipment on conditions that (i) the relay detects that the terminal equipment is located at a matching coverage range and (ii) the relay determines that the second network is available for servicing the terminal equipment at the matching coverage range;
controlling the terminal equipment to switch the terminal equipment's current connection to the first network from a macro base station of the first network to a micro base station of the first network when detecting entrance of the terminal equipment currently connected the first network through the macro base station into the matching coverage range servicing for (i) a coverage area of the micro base station of the first network and (ii) a coverage area of the second network, wherein the first network is serviced by the macro base station and the micro base station, and wherein the matching coverage range is same as a first service coverage range serviced by the micro base station of the first network and a second service coverage range of the second network;

controlling the terminal equipment to additionally connect to the second network in order to simultaneously transmit data via the first network and the second network;

partitioning the data to be simultaneously transmitted into first partial data and second partial data; and transmitting, to the terminal equipment, the first partial data through the first network serviced by the micro base station and the second partial data through the second network when a terminal equipment is detected to be located at the matching coverage range.

18. A method of transmitting data in a mobile communication network including a first network and a second network, the method comprising:

transmitting data from both the first network and the second network to a relay on conditions that (i) the terminal equipment is detected to be located at a matching coverage range and (ii) the second network is determined to be available for servicing the terminal equipment at the matching coverage range;

switching the terminal equipment's current connection for the first network from a macro base station of the first network to a micro base station of the first network when the terminal equipment currently connected the first network through the macro base station enters into a matching coverage range servicing for (i) a coverage area of the micro base station of the first network and (ii) a coverage area of the second network, wherein the matching coverage range is a simultaneous service coverage range for simultaneously transmitting data using both the first network and the second network when the terminal equipment is detected to be located at the matching coverage range, wherein the first network is serviced by the macro base station and the micro base station, and wherein the matching coverage range is same as a first service coverage range serviced by the micro base station of the first network and a second service coverage range of the second network;

additionally connecting to the second network in order to simultaneously transmit data via the first network and the second network;

partitioning the data to be simultaneously transmitted into first partial data and second partial data; and simultaneously transmitting, to the relay, the first partial data through the first network serviced by the micro base station and the second partial data through the second network when the terminal equipment is detected to be located at the matching coverage range.

\* \* \* \* \*